United States Patent [19]

Fujita

[11] Patent Number: 5,236,388

[45] Date of Patent: Aug. 17, 1993

[54] AUTOMATIC FISHING GUT BINDING MACHINE

[75] Inventor: Yasuhiro Fujita, Morioka, Japan

[73] Assignee: Soken Corporation, Iwate, Japan

[21] Appl. No.: 841,040

[22] Filed: Feb. 25, 1992

[30] Foreign Application Priority Data

Feb. 25, 1991 [JP] Japan .............................. 3-035316[U]

[51] Int. Cl.⁵ ............................................ A22C 25/00
[52] U.S. Cl. ..................................... 452/198; 43/54.1;
43/57.2; 100/1
[58] Field of Search ...................... 452/198, 185; 426/1;
43/54.1, 55, 57.2; 100/1

[56] References Cited

U.S. PATENT DOCUMENTS 4,179,834 12/1979 Thomas .................................. 43/57.2

Primary Examiner—Willis Little
Attorney, Agent, or Firm—Frishauf, Holtz, Goodman & Woodward

[57] ABSTRACT

According to the present invention, an automatic fishing gut binding machine comprises a base member having a rail mounted thereon; a slide member mounted on the rail so as to be slidable along the rail; and a magnetic unit mounted to the slide member for movement with the slide member along the rail, the magnetic unit comprising upper and lower magnetic members magnetically coupled together, an opening on the magnetic members for receivingly engaging a fishing hook, and an area for engaging a fishing line. Further provided is a twisting apparatus mounted on the base member, the twisting apparatus including a twisting member having a generally U-shaped cutting-stop channel therein, and a fishing line connection member on the twisting member for connecting an end portion of a fishing line to the twisting member. The twisting apparatus further includes a gear train coupled to the twisting member for twisting a fishing line received in the cutting-stop channel of the twisting member; and a handle for rotating the gears of the gear train so as to rotate the twisting member. Suspension posts are mounted to the base member for suspending a main fishing line such that the main fishing line passes through the U-shaped channel of the twisting member.

16 Claims, 3 Drawing Sheets

AUTOMATIC FISHING GUT BINDING MACHINE

BACKGROUND OF THE INVENTION

This invention relates to an automatic fishing gut binding machine.

In the fishing industry, since long ago and up to the present, fish have been caught in large quantities through the use of nets, rods, and extended lines. This has been the situation in Japan as well as in most countries of the world. Recently, there have been large numbers of requests for the use of extended lines and rods rather than the use of nets due to the value of the captured fish, demands for the protection of natural resources, and other reasons. Due to these factors, but primarily due to economic demand, the fishing industry based on the use of extended lines has been flourishing. This is the case where rods are used but it is also particularly true where extended lines are employed. These extended lines, or main fishing lines, are comprised of a number of elongated (extended) fishing lines, large quantities of fishing gut and fishhooks. Fishhooks in large quantities are tied to the fishing gut, and a large number of the fishing gut with attached fishhooks are, in turn, attached to each of the main extended fishing lines.

The above operation may involve a "short" main fishing line of about 3 km in length, or a "long" fishing line of about 15 km in length. If a length of fishing gut with hooks attached to it (hooked fishing gut) is tied to the main fishing line at intervals of about 30 to 50 cm, an immense amount of time and labor is required to complete this job over the usable length of the fishing line. Up until now, the work of binding fishhooks to fishing gut and then tying the hooked fishing gut to the main fishing line has been done completely by hand.

On days when they do not go out to sea, fishermen and their families attach by hand, one at a time, fishhooks to the fishing gut, making large quantities of hooked fishing gut. Then they take the lines of hooked fishing gut (these are of course much shorter than the main fishing line) and bind them, one at a time, to the main fishing line at fixed intervals. Depending upon the kind of fish to be caught, and the length of the main fishing line, it often requires over a month's time to make a single main fishing line. In addition, in order to attach the fishhooks to the fishing gut to form hooked fishing gut and, in turn, to attach the hooked fishing gut to the main fishing line at the given intervals, considerable skill is required. Women, children and inexperienced individuals generally do not do the binding job skillfully. In fact, even for skilled fishermen, the job of tying hooked fishing gut to several kilometers of a main fishing line is a major operation requiring an extraordinary amount of time.

In addition, depending on the type of fish to be caught, fishhooks must be bound firmly to the fishing gut, and likewise, the hooked fishing gut must be firmly tied to the main fishing line. A substantial amount of skill and physical strength is required for this work. For women, children, and novices, this labor is difficult. Moreover, because the fishhooks are of different sizes and shapes, some even quite large, occasionally injuries occur whereby the fishhook tip, or an inverted fishhook, pierces someone's hands or fingers. There is also the case when an individual is unaccustomed to the handling of the fishing hooks and fishing gut. At such times, fishing gut and lines become entangled, causing not only inconvenience, but sometimes even injury.

An object of the present invention is to provide a machine for tying string to fishhooks, rope, or other line. A further object is to provide such a machine which is particularly useful for tying fishing gut to fishhooks and for tying the resulting hooked fishing gut to the main fishing line.

SUMMARY OF THE INVENTION

According to the present invention, an automatic fishing gut binding machine comprises a base member having a rail mounted thereon; a slide member mounted on the rail so as to be slidable along the rail; and a magnetic unit mounted to the slide member for movement with the slide member along the rail, the magnetic unit comprising upper and lower magnetic members magnetically coupled together, means on the magnetic members for engaging a fishing hook, and means for engaging a fishing line. Further provided is a twisting apparatus mounted on the base member, the twisting apparatus including a twisting member having a generally U-shaped cutting-stop channel therein, and a fishing line connection member on the twisting member for connecting an end portion of a fishing line to the twisting member. The twisting apparatus further includes gear means coupled to the twisting member for twisting a fishing line received in the cutting-stop channel of the twisting member; and means for rotating the gear means so as to rotate the twisting member. Suspension means are mounted to the base member for suspending a main fishing line such that the main fishing line passes through the U-shaped channel of the twisting member.

DETAILED DESCRIPTION

Figure 1:
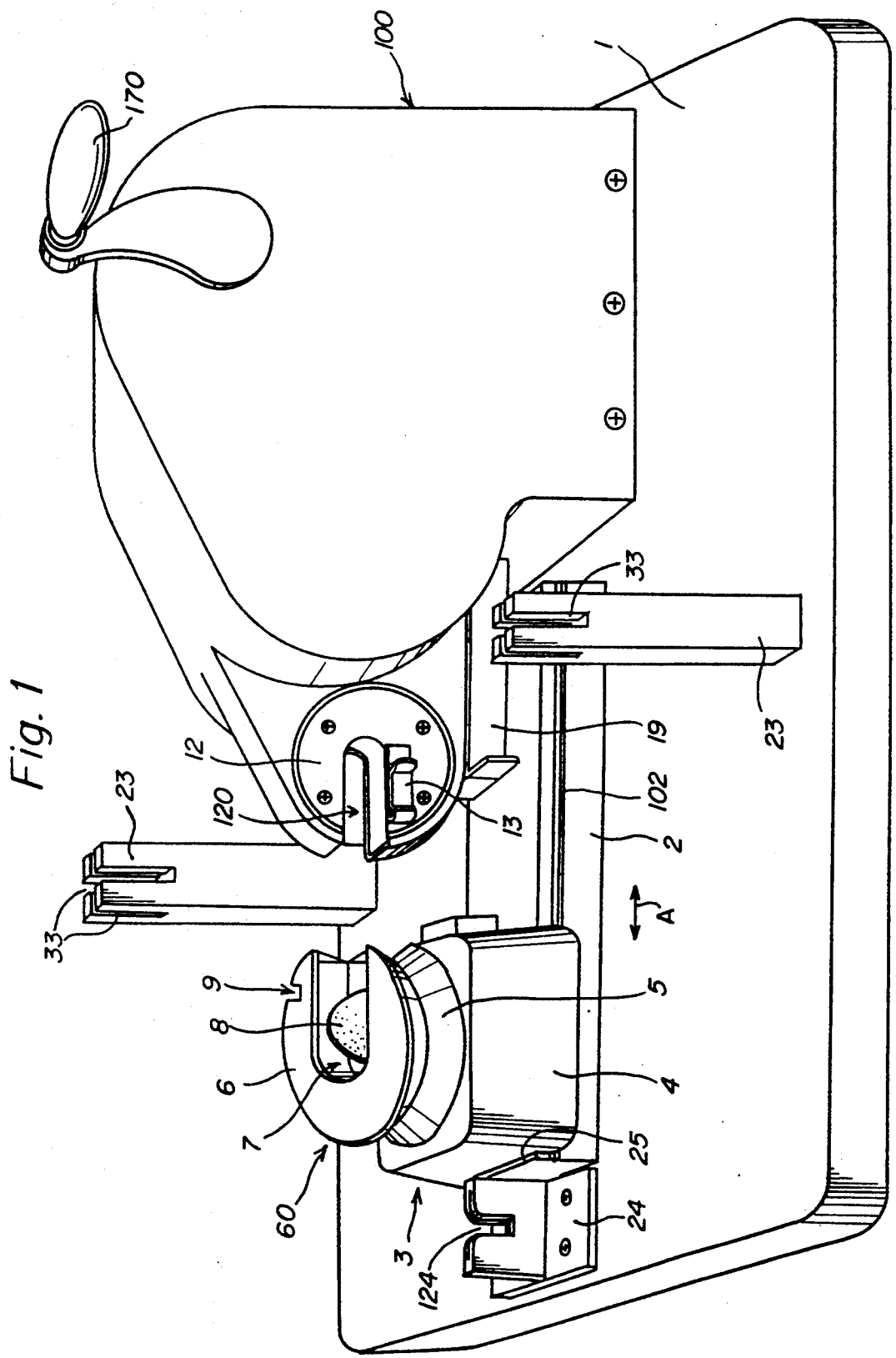
FIG. 1 is a perspective view showing the entire automatic fishing gut binding machine of the present invention.
Figure 2:
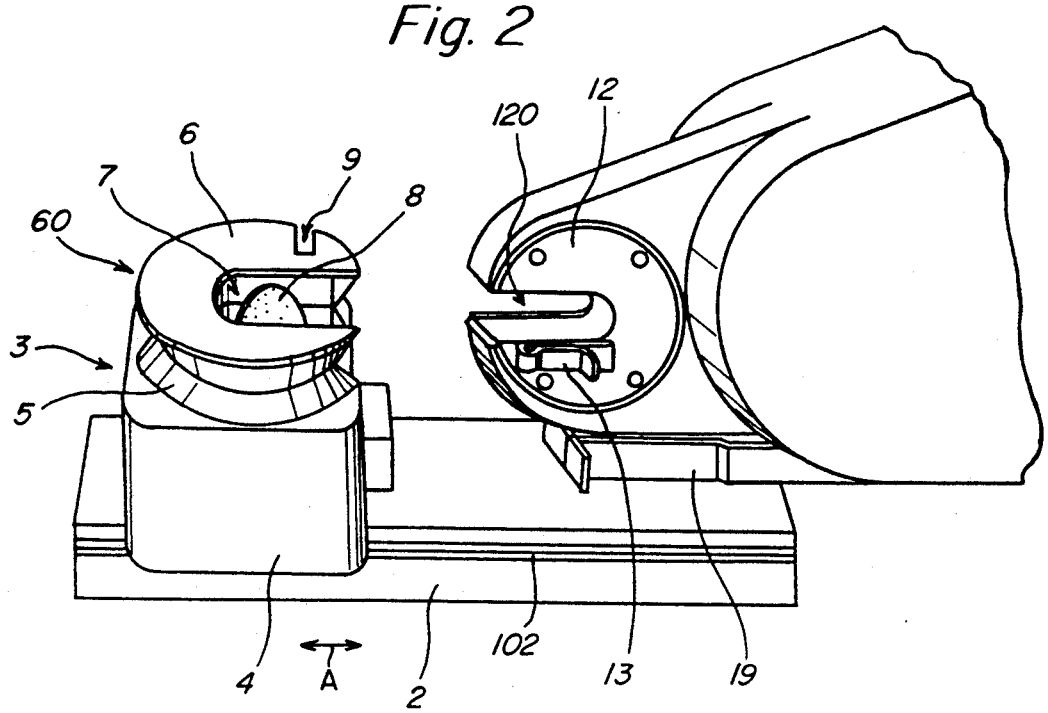
FIG. 2 illustrates a part of the machine, showing an operative portion thereof in greater detail.
Figure 3:
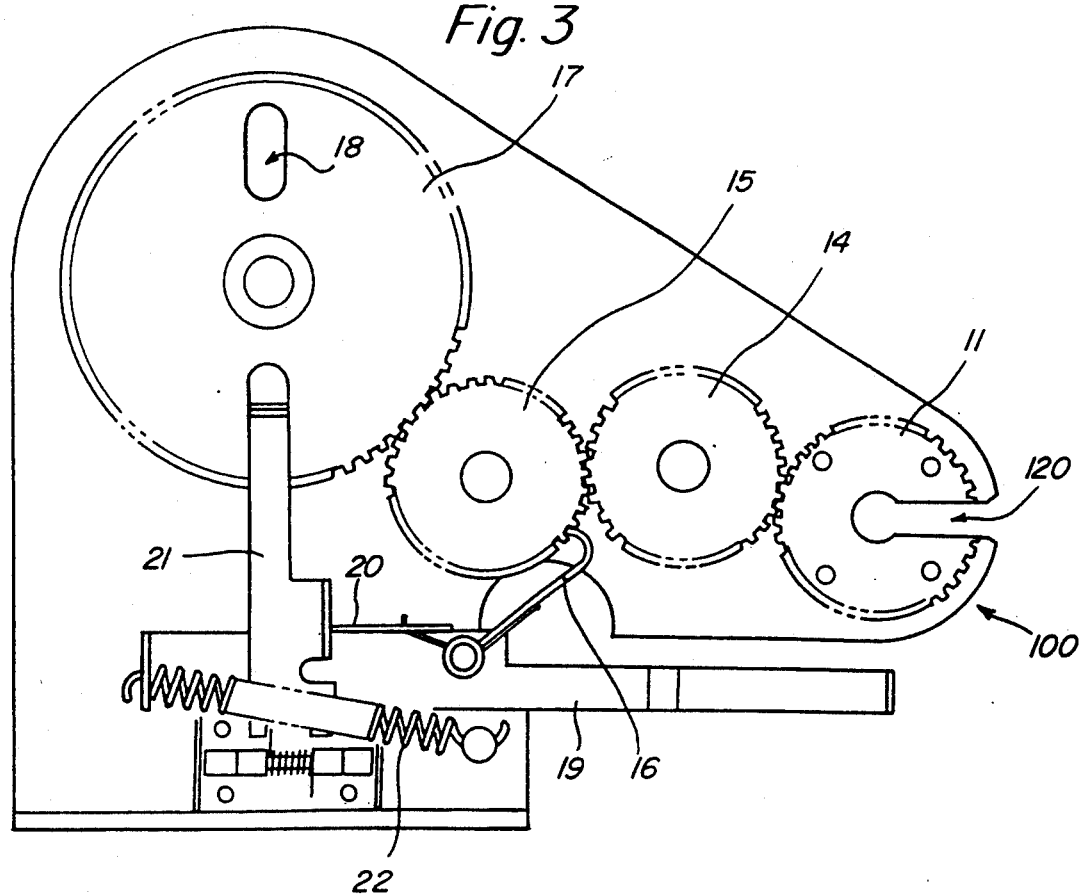
FIG. 3 illustrates a part of the machine, showing the twisting gear unit in detail.

Referring to FIGS. 1-3, the fishing gut binding machine of the present invention comprises a substantially flat main base member 1 which can be made of metal, plastic or other suitable material. The base member 1 should be made from material that is as light and as strong as possible. Plastic is preferred in particular, because it is light, strong, relatively easy to manufacture, and does not rust and is generally non-corrosive.

A rail 2 (in the form of a raised block in the illustrated embodiment) is mounted on the main base member 1. A reel pedestal 3. is movably mounted on the rail 2. The reel pedestal 3 is movable horizontally on the rail 2 as shown by arrows A in FIGS. 1 and 2. The rail 2 is preferably made of plastic, such as the same plastic material as that of the main base member 1. Other strong materials, of course, such as metal, could be used. The rail 2 can be permanently fixed to the main base member 1, or it can be fixed to the main base member 1 in such a way that it is attachable or removable from base member 1 (for example by means of screws or the like). A stop member 25 (FIG. 1) is provided at one end of the rail 2, for example in the form of a raised lip-like portion at the end of rail 2, thus ensuring that the reel pedestal 3 does not separate from the rail 2. Stop member 25 may be formed integrally with the rail 2 (as shown in FIG. 1) or separately from the rail 2.

The reel pedestal 3 comprises a slide pedestal 4 which is slidable horizontally along rail 2, as shown by the arrows A in FIGS. 1 and 2. The reel pedestal 3 further comprises a lower magnetic unit 5 mounted on the slide pedestal 4, and an upper magnetic unit 6 mounted on the lower magnetic unit 5, the combination of the lower and upper magnetic units 5, 6 being mounted on the slide pedestal 4 as shown in FIG. 1.

The slide pedestal 4 has inner projections which slideably engage the track or indentation 102 on rail 2. The slide pedestal 4 is moved along the rail by hand. Bearings or rolling wheels may be provided to facilitate movement of pedestal 4 along the rail 2. The slide pedestal 4 is made of, for example, a plastic material, or any other suitably strong material.

The lower magnetic unit 5 is fixed to the top of the slide pedestal 4. The upper magnetic unit 6 is mounted on top of the lower magnetic unit 5. The upper and lower magnetic units 6 and 5, together, comprise a reel bridge unit 60. The upper magnetic unit 6 is attached to the lower magnetic unit 5 through the use of a magnet, and thus can be attached or removed freely, at will. However, the connecting magnetic force must be of considerable strength in order that the upper magnetic unit 6 will not inadvertently slip off of the lower magnetic unit 5 or come out of place during use.

The reel bridge unit 60, which comprises the upper and lower magnetic units 6 and 5, may have a generally columnar shape, but its shape is usually compressed and outwardly flared as shown in FIGS. 1 and 2. This is so that when the fishing gut is wound around the reel bridge unit 60, the fishing gut will not easily slip off.

A U-shaped cutting-stop space or channel 7 is formed in the reel bridge unit 60. Because this U-shaped cutting-stop channel 7 is provided in both the upper and lower magnetic units 6, 5 of the reel bridge unit 60, when the upper magnetic unit 6 is removed from the lower magnetic unit 5, each of the upper and lower magnetic units appears to have almost the same shape, but are inverted relative to each other.

Figure 4:
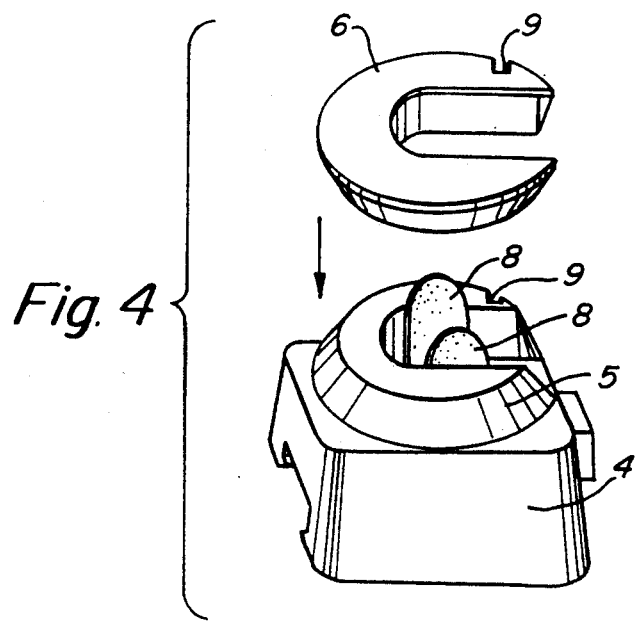
FIG. 4 shows an exploded view of an embodiment of the upper and lower magnetic units which may be used in the embodiment of FIG. 1.

An elastic part 8, having preferably a spring-shape, is fitted in the side wall of the U-shaped cutting-stop channel 7. See FIG. 4 for a better showing of the elastic part 8. The elastic part 8 is mounted so that part of it makes contact with the side wall of the U-shaped cutting-stop channel 7 of the lower magnetic unit 5, which forms part of the reel bridge unit 60. This prevents the upper magnetic unit 6 from slipping off lower magnetic unit 5 or coming out of place. Moreover, the elastic part 8 is also mounted so that it can expand and contract vertically. When a downward pressure is exerted onto the head or uppermost part of the elastic part 8, it is compressed against the side wall of the U-shaped cutting-stop channel 7 of the lower magnetic unit 5. Then the elastic part 8 moves downwardly away from the side wall of the U-shaped cutting-stop channel 7 of the upper magnetic unit 6 and is pressed completely below the upper magnetic unit 6. Even though the elastic part 8 is compressed below upper magnetic unit 6, in the next instant, when the downward force is released, it expands upwardly and returns to its original state.

In a preferred embodiment, the part 8 made of elastic material is a U-shaped part that is mounted inside the U-shaped cutting stop channel 7 which is the groove or gutter that is inside the reel bridge unit 60 (FIGS. 1 and 2). The prongs of the U-shaped elastic part 8 extend upwards along the inside wall of the reel bridge unit 60. The arms of the U-shaped elastic part 8 extends a little beyond the point at which magnetic units 5 and 6 touch. The upper half of the prongs, or arms of the U of part 8 can be attached to the base or bottom half of the U-shaped elastic part 8 by springs so that the prongs will bend easily and let the fishing gut be pulled through the space between magnetic units 5 and 6.

A cutting-stop opening 9 is provided in the reel bridge unit 60 and in the side wall of the slide pedestal 4. Fishhooks or the like are fixed to the cutting-stop opening 9 temporarily. If this cutting-stop opening 9 was not present, fishhooks could not be tied, and hooked fishing gut could not be formed. The cutting-stop opening 9 can also be arranged on, or at, another optional place on the reel bridge unit 60.

The other end of the main base member 1 holds a twisting gear unit 100. The twisting gear unit 100 comprise a twisting gear fixed plate 12 (see FIGS. 1 and 2), which has a cutting-stop channel 120 formed therein, and a twisting gear 11 (see FIG. 3) connected internally of the housing of unit 100. The twisting gear 11 likewise has a cutting-stop channel 120 formed therein.

As seen in FIG. 3, the gear 11 is rotatably mounted next to and meshing with gear 14, which is rotatably mounted to the housing of the twisting gear unit 100. The gear 14 is mounted next to and in mesh with gear 15, which is coupled to a lever 16 mounted in the stopping-section 19 (which holds the open-shut panel). The gear 15 is mounted next to and in mesh with gear 17, which has a handle 170 connected thereto to rotate gear 17. Gear 17 also has a stopper hole 18 therein (to be described later). Adjacent the gear 17 is mounted a stop member 21, which is mounted in the base on a board or other structure made of strong material. Stop member 21 has a projection (not shown) which is engageable in stopper opening 18 of the gear 17.

The other end of the stopping-section 19 extends in the direction of the above-mentioned reel pedestal 3, as seen in FIGS. 1 and 2.

Beside the above gears, the twisting gear unit 100 also comprises said stopping-section 19, base panel unit, and an elastic spring member 22 which is installed as a stopping control member. The stopper hole or opening 18 in gear 17 can be optionally provided.

Figure 5:
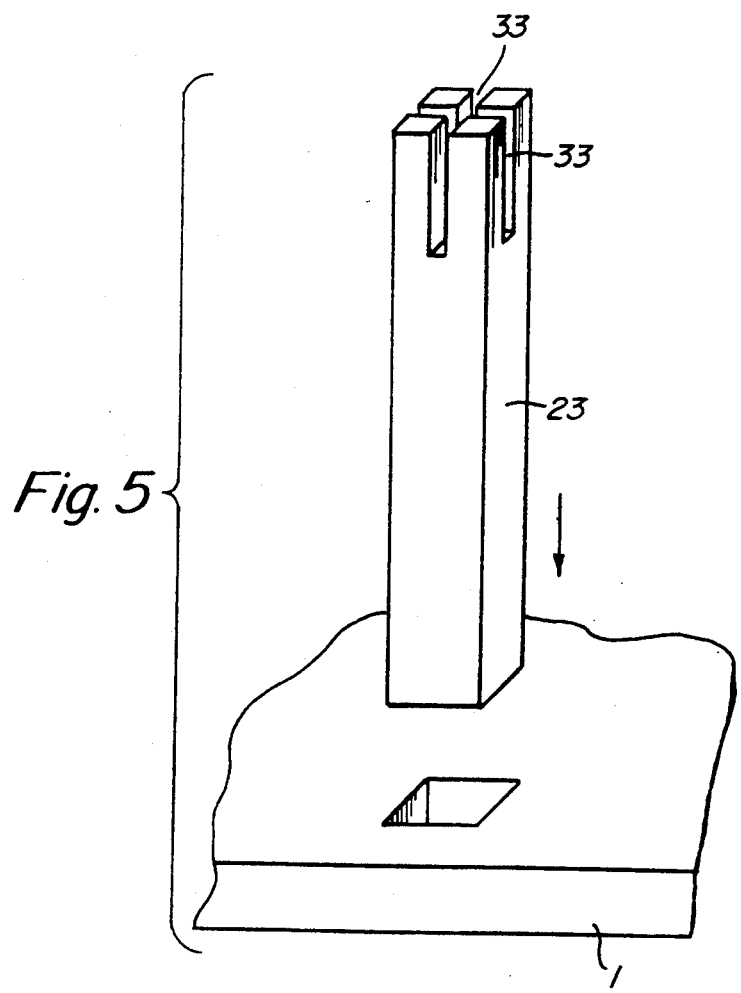
FIG. 5 is an enlarged illustration showing how fishing line suspension or support members are removably connected to the base member of the apparatus.

Rope-suspension rods 23, which have grooves 33 therein of varying thickness, are also mounted to base member 1 at the forward end of the twisting gear unit 100 as seen in FIG. 1. The suspension rods 23 may be removably mounted in the base 1 as shown in FIG. 5, or they may be fixed to the base member 1.

The twisting gear unit 100 need not always comprise four gears meshed together. It can, in fact, be more simply made up of three gears. When using three gears, the number of rotations of the gears may differ and the first gear 11 rotates in a counter-clockwise direction (opposite to the direction of rotation when four gears are used, as should be apparent).

The fishing line suspension rods 23 are removably set in the base member 1. There are two of these rods 23 in the illustrated embodiment. The suspension rods 23 can be permanently fixed to the base member 1, but in the preferred embodiment of the invention, the suspension rods 23 are mounted so that they can be freely attached or detached. The upper heads of the two fishing line suspension rods 23 are provided with grooves 33 of varying thickness to accommodate the main fishing line, whose diameter can vary. Depending on whether the diameter of the main fishing line is large or small, one is able to choose a groove 33 which is most suitable. Moreover, since the suspension rods 23 can preferably be attached or detached at will, it is also possible to use other suspension rods 23 containing grooves 33 with different varying degrees of thickness to accommodate a larger variety of fishing line sizes.

A cutter 24, which holds a cutting blade, is mounted to base member 1 adjacent the end of rail 2, as shown in FIG. 1. When the fishhooks are tied to the fishing gut, or when the hooked fishing gut is bound to the main fishing line, the cutter 24 is used to cut away the excess line. Cutting is performed by pressing the line into cutter slot 124 to cut the fishing line by means of the blade in the cutter slot 124.

The following is a description of how the operation is carried out, whereby the fishhooks are tied to the fishing gut, and the fishing gut with fishhooks attached, is tied to the main fishing line. First, for the purpose of tying the fishhooks to the fishing gut, the fishhook is placed into the cutting-stop opening 9, which opening is in the side wall of the reel bridge unit 60. Next, one end of the fishing gut is run securely through the string-suspension spring member 13 (spring member 13 is preferably made of spring metal), which is mounted to the twisting gear fixed plate 12, and then the fishing gut is wound a number of times (the number of times is left to the discretion of the operator) around the reel bridge unit 60, which holds the fishhook in opening 9. At the same time that the fishing gut is tied around the compressed or reduced size central part of the reel bridge unit 60, the fishing gut will be visible at the cutting-stop channel 7, which is formed in the reel bridge unit 60.

Next, the reel pedestal 3 is caused to move along the rail 2 in the direction toward the twisting gear unit 100 so that member 4 of pedestal 3 contacts the stopping section 19 (FIG. 1). Due to this movement, pressure is put on the stopping section 19 of the twisting gear unit 100, through the action of the open-shut panel 20 (FIG. 3). The stop-member 21 (FIG. 3) is caused to separate from the stopper hole 18 of gear 17 while simultaneously the cutting-stop channel 7 of the reel bridge unit 60, the twisting gear 11 and the cutting-stop channel 120 which is formed in the twisting gear fixed plate 12, all enter an engaged condition (i.e., the fixed plate 12 enters the channel 7).

In this engaged condition, the operator holds the handle 170 which is connected to gear 17 of the twisting gear unit 100. The gear 17 is caused to rotate by turning of the handle 170 and this rotation in turn makes the gear 15, gear 14, and twisting gear 11 rotate. The twisting gear 11 rotates with the twisting gear fixed plate 12. While rotating, the twisting gear 11 grasps the fishing gut which is strung through the string-suspension spring member 13 of the twisting gear fixed plate 12 and wraps the fishing gut around the circumference of the fishing gut which is wrapped around the reel bridge unit 60. After one full rotation of the gear 17, the stop-member 21 engages into the stopper hole 18 of gear 17 and stops rotation of gear 17. Simultaneously, the handle 170 locks and can no longer bee rotated. Then, as the reel pedestal 3 is pulled to the left in FIG. 1, the fishing gut passes between the magnetic units 6, 5 in an instant (due to separation of units 5, 6 as the line passes therebetween). Simultaneously, the elastic part 8 installed in the cutting-stop channel 7 of the reel bridge unit 60 contracts, this action also occurring in an instant. As a result, fishing gut is then bound to the fishhook set in the cutting-stop opening 9.

Even as the fishing gut passes in an instant between the upper magnetic unit 6 and the lower magnetic unit 5, both magnetic units 6, 5, through the effect of the strong magnetism and the action of the elastic part 8, the upper magnetic unit 6 does not slip or fall off of the lower magnetic unit 5. It is in this way that the fishing gut is bound to the fishhooks.

Next, the binding of the fishing gut containing fishhooks to the main fishing line is carried out. The main fishing line, supported by suspension rod 23, passes through the cutting-stop channel 120 in the twisting gear 11, both of which comprise a single unit with the twisting gear fixed plate 12. The main fishing line is fixed in the grooves of the rope-suspension rods 23 of the base member 1. Then, one end of the already hooked fishing gut is fastened to the spring-like string-suspension member 13, which is mounted to the twisting gear fixed plate 12. In addition, the fishing gut is wound around the reel bridge unit 60. After doing this, the operation is the same as that for binding the fishhooks to the fishing gut (i.e., rotating handle 170, moving pedestal 4, etc.). In this way, through this operation, one is able first to easily tie the fishhooks to the fishing gut, and then the fishing gut containing the attached hooks can be bound to the main fishing line.

A feature of the automatic fishing gut binding machine of the present invention is that by means of the twisting gear unit 100, which houses the gears 11, 14, 15, and 17, the speed of rotation either of gears 14 and 15 can be decreased.

The automatic fishing gut binding machine disclosed herein provides a quick and efficient mechanism for binding fishhooks to fishing gut, as well as for binding hooked fishing gut to a main fishing line. Hence, the problem of excessive time and labor used in the binding process has been eliminated.

Having described specific preferred embodiments of the invention with reference to the accompanying drawings, it will be appreciated that the present invention is not limited to those specific embodiments, and that various changes and modifications can be effected therein by one of ordinary skill in the art, and that the various features can be used in any combination, without departing from the scope or spirit of the invention as defined in the appended claims.

What is claimed is:

1. An automatic fishing gut binding machine, comprising:
   a base member having a rail mounted thereon;
   a slide member mounted on said rail so as to be slidable along said rail;
   a magnetic unit mounted to said slide member for movement with said slide member along said rail, said magnetic unit comprising upper and lower magnetic members magnetically coupled together, means for engaging a fishing hook, and means for engaging a fishing line;
   a twisting apparatus mounted on said base member, said twisting apparatus including a twisting member having a generally U-shaped cutting-stop channel therein, and a fishing line connection member on said twisting member for connecting an end portion of a fishing line to said twisting member;

said twisting apparatus further including:

gear means coupled to said twisting member for twisting a fishing line received in said cutting-stop channel of said twisting member; and means for rotating said gear means so as to rotate said twisting member; and suspension means coupled to said base member for suspending a main fishing line such that said main fishing line passes through said U-shaped channel of said twisting member.

2. The machine of claim 1, wherein said suspension means comprises upright members having grooves therein for receiving a fishing line in said groove.

3. The machine of claim 2, wherein said suspension means has grooves of varying thicknesses for receiving different size fishing lines therethrough.

4. The machine of claim 2, wherein said upright members are removably connected to said base member.

5. The machine of claim 2, wherein said upright members are arranged at opposite sides of said twisting apparatus and are in alignment with said generally U-shaped cutting-stop channel in said twisting member for permitting a fishing line supported by said upright members to pass through said cutting-stop channel in said twisting member.

6. The machine of claim 1, further comprising cutting means on said base member adjacent said rail for cutting off an excess portion of a fishing line.

7. The machine of claim 1, further comprising stop means for stopping movement of said slide member along said rail at predetermined positions at opposite end portions of said rail.

8. The machine of claim 1, further comprising handle means controlled by an operator for rotating said gear means.

9. The machine of claim 1, further comprising stop control means coupled to said gear means for stopping rotation of said gear means after a predetermined amount of rotation thereof.

10. The machine of claim 9, further comprising means for sensing sliding of said slide member to a position adjacent said twisting apparatus for releasing said stop control means to permit rotation of said gear means when said slide member is in said position adjacent said twisting apparatus.

11. The machine of claim 1, wherein said upper and lower magnetic members are magnetically engaged with each other so as to slightly separate to permit a fishing string to pass therebetween, without becoming magnetically disengaged from each other, during operation of said fishing gut binding machine.

12. The machine of claim 1, wherein said magnetic unit has a generally U-shaped channel formed therein; and an elastic member mounted in said channel for cooperating with said upper and lower magnetic members and with a fishing line engaged thereon, during operation of said machine.

13. The machine of claim 12, wherein said elastic member is a spring-like elastic member which resiliently yields responsive to forces applied thereto.

14. The machine of claim 12, wherein said means for engaging a fishing hook comprises a fishing hook engaging opening on said upper and lower magnetic members for receiving a fishing hook therein, and said means for engaging a fishing line comprises a peripheral portion of said upper and lower magnetic members such that when said fishing line is engaged on said upper and lower magnetic members, said fishing line passes around a fishing hook engaged in said fishing hook engaging opening.

15. The machine of claim 1, wherein said fishing line connection member on said twisting member comprises a spring member biased towards said twisting member and which is resiliently yieldable to receive a fishing line and for engaging said fishing line to substantially fix an engaged fishing line to said twisting member.

16. The machine of claim 1, wherein said slide member is manually movable along said guide rail.

* * * * *